United States Patent Office 2,755,274
Patented July 17, 1956

2,755,274

PENICILLIN-STREPTOMYCIN COMPOUND

Heinrich Mückter and Erich Jansen, Stolberg, Rhineland, Germany, assignors to Chemie Gruenenthal G. m. b. H., Stolberg im Rhineland, Germany, a corporation of Germany No Drawing. Application May 22, 1952, Serial No. 289,436

Claims priority, application Germany December 31, 1951

3 Claims. (Cl. 260—210)

This invention relates to a new and valuable antibiotic preparation, and more particularly to a new penicillin preparation of increased activity, and to a method of making same.

It is one object of this invention to provide a new and valuable antibiotic preparation combining enhanced effectiveness of penicillin and streptomycin and having a surprisingly high prolonged activity.

Another object of this invention is to provide a method of making such new and valuable antibiotic preparation in a simple and effective manner.

A further object of this invention is to provide a valuable intermediate for the manufacture of said new penicillin-streptomycin combination product, said intermediate, per se, possessing valuable therapeutic properties.

Other objects of this invention will become apparent from the specification and the examples given therein.

The new preparation is composed of a streptomycin compounds and the penicillin salts with 2-dialkyl amino alkyl esters of o-hydroxy-p-amino benzoic acid. Said streptomycin compound and said penicillin salt, employed in equimolecular proportion, form an addition compound. Although the constitution of said addition compound is not known, it is supposed that the basic groups of the streptomycin salt molecule are combined with acid groups of the penicillin compound by means of secondary valences.

The new compound is produced, for instance, by mixing equimolecular amounts of both compounds. On addition of water a suspension is obtained which, on injection, exhibits surprising antibiotic effects. It is, of course, also possible, to add to an aqueous suspension of the penicillin compound, the required amount of the streptomycin compound, to allow the compounds to combine and after heating to about 60–65° C. then to subject the same to drying at a low temperature, preferably by freeze-drying. The product obtained is stable and, on addition of water, yields an injectable suspension like that obtained according to the first mentioned method of manufacture.

It is known that penicillin has no marked activity against Mycobacterium tuberculosis while streptomycin is a very effective agent used in the therapy of tuberculosis. For instance, the activity of penicillin, when tested in the known dilution test, is lower than 1:30,000. In contrast hereto, it is known that, for instance, streptomycin compounds have an activity of from 1:100,000 to 1:1,000,000, when tested according to the same dilution method. Its average activity is about 1:500,000.

The penicillin salts mentioned above are also, per se, highly active. The salt of the 2-diethyl amino ethyl ester of o-hydroxy-p-amino benzoic acid with penicillin, has an activity very much like that of streptomycin, i. e. an activity of 1:100,000 to 1:1,000,000. The average activity of said compound per se is about 1:500,000. It is very surprising that a penicillin compound has such a high activity. Combining said penicillin compound with a streptomycin compound produces a new composition which has the surprising activity of about ten times as high as that of its components, namely about 1:5,000,000.

The new compound, therefore, represents considerable advancement in the chemotherapy of tuberculosis. Heretofore all the known antitubercular chemotherapeutic and antibiotic agents had, when tested according to the above mentioned dilution method, in general, an activity of at the most not more than 1:1,000,000. For the first time this limit value is considerably surpassed by the new composition.

These results, achieved on testing the new compounds in vitro, were confirmed by tests in vivo with experimental animals and with tubercular patients. An excellent therapeutic effect is achieved in cases of local tubercular lesions, for instance in the case of tubercular empyemas of the thorax, the joints, etc.

The new compounds have the further advantage that, on account of the much lower dosage required, the side-effects observed in streptomycin therapy, are almost entirely avoided. Furthermore, it was observed that development of resistance to the new antitubercular composition is either completely inhibited or at least considerably retarded.

A further advantage of the new composition is that it produces a very prolonged blood level. Administration of 0.5 g. of streptomycin, for instance, produces a therapeutically effective blood level for about 12 hours. The new composition, in contrast hereto, when administering also 0.5 g. of streptomycin in combination with said penicillin compound, exhibits a therapeutically effective blood level for about 18–24 hours, i. e. about 50% to 100% longer.

Furthermore, the new composition produces a surprisingly extended tissue level, i. e. the content of the tissue, especially of lung tissue, of said new composition remains at a therapeutically effective level for a much longer period of time than when administering the same amount of streptomycin alone.

The penicillin used for making the new intermediates and the new combination with streptomycin may be any of the several specific penicillins as they are obtained in the usual production of penicillin. Of course, one may also use a mixture of several of these penicillins. Preferably a penicillin is used which is rich in penicillin G, i. e. the so-called benzyl penicillin. But also other penicillins may be employed, such as penicillin F ($\Delta_2$-pentenyl penicillin), penicillin dihydro F (n-amyl penicillin), penicillin G (heptyl penicillin), penicillin X (hydroxy benzyl penicillin), penicillin O (allyl mercapto methyl penicillin) and the entire class of penicillin antibiotics.

The streptomycin employed in this invention may be any of the several specific streptomycins as they are obtained in the usual production of streptomycin antibiotics. Preferably dihydrostreptomycin is used, but also other streptomycin antibiotics may be employed, such as streptomycin, hydroxy streptomycin, dihydro hydroxy streptomycin, mannosido streptomycin (streptomycin B) and mixtures containing said streptomycin antibiotics.

Said streptomycin antibiotics are preferably employed in the form of their salts, such as the chlorohydrates, the sulfates, the phosphates, and the entire class of streptomycin salts.

The following examples serve to illustrate this invention without, however, limiting the same to them.

Example 1

56.8 g. of the finely divided penicillin salt of the 2-diethyl amino ethyl ester of o-hydroxy-p-amino benzoic acid are intimately mixed with 68.0 g. of dihydro streptomycin sulfate. Said mixture is diluted, while stirring vigorously, with 150 cc. of sterile, distilled and pyrogen-free water at room temperature. The solution obtained can be administered by intramuscular injection.

Example 2

0.54 g. of the finely divided penicillin salt of 2-dimethyl amino ethyl ester of o-hydroxy-p-amino benzoic acid are intimately mixed with 0.68 g. of finely divided streptomycin sulfate. The mixture is filled into a vial. On diluting the content of said vial with 1.5 cc. of distilled and pyrogen-free water, while shaking vigorously, a preparation is obtained which is readily injectable.

Example 3

In the place of the penicillin salt of 2-diethyl amino ethyl ester of o-hydroxy-p-amino benzoic acid used in Examples 1 and 2, there are employed equimolecular amounts of 2-di-n-propyl amino n-propyl ester of o-hydroxy-p-amino benzoic acid to yield an addition compound with streptomycin sulfate.

Example 4

Equimolecular amounts of the chlorohydrate or phosphate of streptomycin are used in place of sulfate of streptomycin or dihydro streptomycin of the preceding examples. One gets the beneficial results of the addition compounds of penicillin and streptomycin salts even when not combining said salts in equimolecular amounts. Any excess of the one or the other component, employed on making said new antibiotic merely exhibits the antitubercular activity of said component and not the many times higher activity of the combination.

Of course, many changes and variations may be made by those skilled in the art in the reaction conditions, the starting materials employed, the solvents used and the like in accordance with the principles set forth herein and in the claims annexed hereto.

The penicillin salt of a dialkyl amino alkyl ester of o-hydroxy-p-amino benzoic acid is obtained in god yield, for instance, by reacting said dialkylamino alkyl ester, in a suitable solvent, with the addition product of penicillin in acid form and di-isopropyl ether.

Especially suitable organic solvents are, for instance, butyl acetate, amyl acetate, ether, chloroform. The preferred solvents are, however, the alkyl acetates having about 2 to 9 carbon atoms in their molecule. To obtain a readily crystallizing precipitate, it is advisable to employ a penicillin of high activity and purity because impurities present in the penicillin starting material may interfere with the formation of the new penicillin salt.

The following examples serve to illustrate this invention without, however, limiting the same thereto.

Example 5

28.8 g. of the diethyl amino ethyl ester of o-hydroxy-p-amino benzoic acid in the form of its chlorohydrate are dissolved in 75 cc. of distilled water. A solution of 35.7 g. of crystalline penicillin G sodium in 200 cc. of distilled water is added thereto. The new penicillin salt precipitates and is filtered after about 2 hours whereby it is kept at a temperature of about 5° C. It is washed with about 200 cc. of distilled cold water, and is dried in a vacuum at a temperature not exceeding 20° C. The dried penicillin salt of the diethyl amino ethyl ester of o-hydroxy-p-amino benzoic acid has a potency of about 1050 units per mg. Its yield is about 51.6 g. (88% of the theoretical yield). Melting point: 112–114° C. (thereby decomposing).

Example 6

In the place of penicillin sodium used in the preceding example, there is employed an equimolecular amount of penicillin potassium. The same product as described in Example 5 is obtained.

Example 7

35.7 g. of penicillin G sodium are dissolved at 5° C. in 3500 cc. of water. The solution is acidified to a pH of about 2.0 by the addition of dilute sulfuric acid, while stirring. The acidified mixture is then extracted with about 3500 cc. of amyl acetate at a temperature between 0° C. and 5° C.

The amyl acetate solution is separated from the acid aqueous layer and is dried over anhydrous sodium sulfate. 22.4 g. of the dimethyl amino ethyl ester of o-hydroxy-p-amino benzoic acid, dissolved in about 100 cc. of amyl acetate, are added while stirring vigorously, to said amyl acetate solution of penicillin G. The precipitate obtained is filtered off after about 2 hours whereby the reaction mixture is kept at a temperature between 0° C. and 5° C. The new penicillin salt is filtered off, washed with amyl acetate, and dried in a vacuum.

Example 8

2.8 g. of the addition product of penicillin in acid form and di-iso-propyl ether are dissolved in 20 cc. of butyl acetate. Said solution is reacted with a solution of 1.6 g. of diethyl amino ethyl ester of o-hydroxy-p-amino benzoic acid in 20 cc. of butyl acetate. The pH value of the combined solution is about 6.0–7.0. The new penicillin salt precipitates first in a viscous, oily form but crystallizes after a short period of time especially when stirring. After allowing said salt to stand for 2 hours in the refrigerator, it is filtered and dried in a vacuum. Yield: 3.6 g. corresponding to 95.7% of the theoretical yield. Melting point: 112–114° C. (thereby decomposing).

The new compounds, as has been pointed out above, have a surprisingly high antitubercular activity which is of the magnitude of the corresponding amounts by weight of streptomycin. The highest activity is possessed by the ester of o-hydroxy-p-amino benzoic acid.

The new penicillin salts are administered, for instance, in suspension in a finely divided state in an aqueous medium, such as distilled water, or isotonic sodium chloride solution. They may also be employed in suspension in a water-free sterile vegetable oil, such as cottonseed oil, peanut oil, sesame oil and the like. One may furthermore produce emulsions of mixtures of oily and aqueous suspensions of the new salts by mixing said aqueous and oily suspensions in the presence of a water-soluble and of an oil-soluble emulsifying agent.

The new salts, when administered in any of the above described forms, will provide a therapeutically effective blood concentration of at least 0.03 units per cc. of blood for a period of 18 to 24 hours.

The preparation of the dialkyl amino alkyl esters of o-hydroxy-p-amino benzoic acid may be carried out according to the following example.

The ester of the o-hydroxy-p-amino benzoic acid is obtained by starting with the sodium salt of o-hydroxy-p-nitro benzoic acid and reacting the same with diethyl amino ethyl chloride, followed by reduction of the nitro group. When using other dialkyl amino alkanols or dialkyl amino alkyl halogenides the corresponding esters are obtained. Of course, other suitable methods for making said esters may be used likewise.

To produce the above mentioned complex compounds of said penicillin salts with said streptomycin salts, one may proceed in the following manner:

An intimate mixture of said penicillin and streptomycin salts is suspended in water and is then heated for a short period of time to about 60–65° C. Thereby a clear solution is obtained which, on freeze drying, yields the new compound of said penicillin salt and said streptomycin salt. It is very surprising that the new complex compounds, after freeze drying, are readily and completely soluble in water although the penicillin salt used is a rather difficultly soluble compound.

The following example illustrates said above mentioned method of making said new complex compounds.

Example 9

An intimate mixture of 0.5 g. of the penicillin G salt of the diethyl amino ethyl ester of p-amino-o-hydroxy benzoic acid and of 0.5 g. of dihydrostreptomycin sulfate are mixed with 15 cc. of water. 20 mg. of sodium citrate are added to stabilize the penicillin. The suspension is then heated, while shaking vigorously, to 60–65° C. for about 2 minutes. Thereby a clear solution is obtained. Said solution is cooled to room temperature and is filtered whereby small amounts of undissolved particles remain on the filter. The filtrate is then dried lyophilically. A white salt is obtained which is readily soluble in water.

In place of dihydrostreptomycin sulfate, there may be used an equimolecular amount of streptomycin sulfate whereby also a soluble complex compound is obtained.

In place of sodium citrate, 20 mg. of a neutral phosphate buffer salt mixture or any other buffer mixture imparting and maintaining neutral reaction in the mixture of the reacting components in water may be employed likewise.

Clinical results have shown that administration by intramuscular injection of twice daily of a complex compound composed of about 500,000 i. u. of a salt of penicillin with a 2-dialkyl amino alkyl ester of o-hydroxy-p-amino benzoic acid and about 500,000 i. u. of a salt of streptomycin produces good curative effects in tubercular patients, especially those afflicted with local tubercular lesions. Of course, the treatment with these new complex compounds is by no means restricted to these dosages.

A further great advantage of the new complex compounds is the fact that they are not affected in their activity by blood serum. In some cases even an increase in activity could be observed in the presence of blood serum.

There are described in the preceding Examples 5 to 8 methods of preparing the penicillin salt of dialkyl amino alkyl esters of o-hydroxy-p-amino benzoic acid. It was found that such salts can be produced in a very good yield and in a simple manner by using the N-glycosides of said esters of o-hydroxy-p-amino benzoic acid as the one reaction component. Said N-glycosides may also be used in order to produce other salts of penicillin, for instance, the salts with other dialkyl amino alkyl esters of halogeno p-amino benzoic acids or even with dialkyl amino alkyl esters of p-amino benzoic acid itself. Thus, it is possible to produce, for instance, procaine penicillin in a very efficient manner by means of procaine glucoside.

The following example illustrates this new process without, however, being limited thereto.

Example 10

2.8 g. of the hydrochloride of the N-glucoside of the diethyl amino ethyl ester of o-hydroxy-p-amino benzoic acid are dissolved in 15 cc. of water. This solution is added to a solution of 2.2 g. of sodium penicillin G, dissolved in 15 cc. of water. The mixture is stirred. Slowly the penicillin salt of the diethyl amino ethyl ester of o-hydroxy-p-amino benzoic acid precipitates. Precipitation is accelerated by scratching with a glass rod and vigorously stirring. The precipitate is filtered off by suction and the salt is dried lyophilically. Melting point of the dry product: 112–114° C., thereby decomposing.

The hydrochloride of the N-glucoside of said diethyl amino ethyl ester of o-hydroxy-p-amino benzoic acid is obtained in the following manner:

Example 11

5.76 g. of the hydrochloride of the diethyl amino ethyl ester of o-hydroxy-p-amino benzoic acid are dissolved in 40 cc. of ethanol while boiling under reflux. A solution of 3.6 g. of glucose and 0.1 g. of ammonium chloride in 2 cc. of water is added to said boiling solution and boiling is continued for 10 minutes. The solution is then placed into a refrigerator. Soon a white crystalline mass precipitates, the amount of which on standing for several days, increases still further. The precipitate is filtered off by suction and is washed with alcohol. On evaporation of the alcohol in a vacuum further amounts of crystals are obtained from the filtrate. The glucoside precipitates in the form of its monohydrate. Its melting point is about 128–132° C.

In place of glucose, one may employ other carbohydrates adapted to form N-glycosides with said p-amino benzoic acid derivatives. Glucose, however, on account of its ready availability, is the preferred carbohydrate, but others, such as galactose, fructose, mannose, rhamnose, ribose, may be used likewise.

We claim:

1. As a penicillin-streptomycin compound, the complex compound of the substantially insoluble penicillin salt of the diethylamino ethyl ester of o-hydroxy-p-amino benzoic acid and a substantially water soluble salt of an antibiotic of the streptomycin group.

2. As a penicillin-streptomycin compound, the complex compound of the substantially insoluble penicillin salt of the diethylamino ethyl ester of o-hydroxy-p-amino benzoic acid and the sulfate of dihydrostreptomycin.

3. As a penicillin-streptomycin compound, the complex compound of the penicillin G salt of the diethylamino ethyl ester of o-hydroxy-p-amino benzoic acid and the sulfate of dihydrostreptomycin, said penicillin salt and said dihydrostreptomycin salt being present in said complex compound in about equimolecular proportions.

References Cited in the file of this patent

UNITED STATES PATENTS

| | | |
|---|---|---|
| 1,765,621 | Schoeller | June 24, 1930 |
| 2,547,782 | Rhodehamel | Apr. 3, 1951 |
| 2,565,653 | Fried et al. | Aug. 28, 1951 |
| 2,587,574 | Young | Feb. 26, 1952 |

FOREIGN PATENTS

| | | |
|---|---|---|
| 189,335 | Germany | Oct. 7, 1907 |

OTHER REFERENCES

Grossman: Squibb Abst. Bull. 23:7 page A–171, Feb. 15, 1950.

Spicer: Journ. Lab. and Clin. Med., August 1950, page 183.

Modern Drugs, January 1951, page 542.

Grimme et al.: "Arzneimittel-Forsch" vol. 1 (October 1951), pages 326 and 327.